United States Patent
Hong et al.

(10) Patent No.: US 12,147,835 B2
(45) Date of Patent: Nov. 19, 2024

(54) SYSTEMS AND METHODS FOR I/O COMMAND SCHEDULING BASED ON MULTIPLE RESOURCE PARAMETERS

(71) Applicant: Samsung Electronics Co., Ltd., Suwon-si (KR)

(72) Inventors: Ilgu Hong, Santa Clara, CA (US); Yang Seok Ki, Palo Alto, CA (US); Changho Choi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/119,601

(22) Filed: Mar. 9, 2023

(65) Prior Publication Data

US 2023/0214259 A1    Jul. 6, 2023

Related U.S. Application Data

(63) Continuation of application No. 17/333,316, filed on May 28, 2021, now Pat. No. 11,620,159.

(60) Provisional application No. 63/179,013, filed on Apr. 23, 2021.

(51) Int. Cl.
*G06F 9/48* (2006.01)
*G06F 9/50* (2006.01)
*G06F 13/28* (2006.01)

(52) U.S. Cl.
CPC .......... *G06F 9/4881* (2013.01); *G06F 9/5011* (2013.01); *G06F 13/28* (2013.01)

(58) Field of Classification Search
None
See application file for complete search history.

(56) References Cited

U.S. PATENT DOCUMENTS

| | | | |
|---|---|---|---|
| 6,466,559 B1 | 10/2002 | Johansson et al. | |
| 6,857,020 B1 | 2/2005 | Chaar et al. | |
| 8,037,219 B2 | 10/2011 | Jibbe et al. | |
| 8,145,785 B1 | 3/2012 | Finkelstein et al. | |
| 8,966,490 B2 | 2/2015 | Avni et al. | |
| 9,397,944 B1* | 7/2016 | Hobbs | H04L 47/522 |
| 9,792,051 B2 | 10/2017 | Liu et al. | |
| 11,275,590 B2* | 3/2022 | Vincent | G06F 9/3814 |
| 2010/0146103 A1 | 6/2010 | Hisatomi et al. | |
| 2010/0186010 A1* | 7/2010 | Chalemin | G06F 9/5077 718/1 |
| 2015/0095917 A1 | 4/2015 | Challenger et al. | |
| 2016/0004438 A1 | 1/2016 | Moon et al. | |

(Continued)

OTHER PUBLICATIONS

Advisory Action for U.S. Appl. No. 17/082,933 dated Jul. 26, 2022, 3 pages.

(Continued)

*Primary Examiner* — Michael Sun
(74) *Attorney, Agent, or Firm* — Lewis Roca Rothgerber Christie LLP

(57) ABSTRACT

A method for scheduling input/output (I/O) commands is described. The method includes receiving, by an I/O scheduler, an I/O command from an application; generating, by the I/O controller, an I/O resource requirement based on the I/O command; determining, by a traffic controller, that an amount of available resources satisfies a criteria based on the I/O resource requirement; and sending, by the traffic controller, the I/O command to a queue in response to the criteria being satisfied.

20 Claims, 9 Drawing Sheets

(56) References Cited

U.S. PATENT DOCUMENTS

| | | | |
|---|---|---|---|
| 2016/0034415 A1* | 2/2016 | Singh | G06F 13/28 |
| | | | 710/313 |
| 2016/0224389 A1* | 8/2016 | Guttahalli Krishna | |
| | | | G06F 3/0644 |
| 2018/0026852 A1* | 1/2018 | Anderson | H04L 43/16 |
| | | | 709/224 |
| 2018/0067772 A1 | 3/2018 | Frandzel et al. | |
| 2018/0143855 A1 | 5/2018 | Kim et al. | |
| 2018/0293185 A1* | 10/2018 | Vembu | G06F 9/5027 |
| 2019/0114208 A1 | 4/2019 | Yabe | |
| 2019/0215277 A1 | 7/2019 | Dhanoa | |
| 2019/0220189 A1 | 7/2019 | Yang et al. | |
| 2019/0278523 A1 | 9/2019 | Benisty | |
| 2019/0370073 A1 | 12/2019 | Behar et al. | |
| 2020/0050366 A1 | 2/2020 | Bavishi et al. | |
| 2020/0089537 A1 | 3/2020 | Bahirat et al. | |
| 2020/0097183 A1 | 3/2020 | Rawal et al. | |
| 2020/0104184 A1 | 4/2020 | Subramanian et al. | |
| 2020/0127938 A1 | 4/2020 | Duarte et al. | |
| 2020/0287837 A1 | 9/2020 | Meng et al. | |
| 2020/0293465 A1 | 9/2020 | Yang et al. | |
| 2020/0379684 A1 | 12/2020 | Subbarao et al. | |
| 2021/0200703 A1 | 7/2021 | Simionescu et al. | |
| 2021/0266253 A1* | 8/2021 | He | H04L 49/70 |
| 2021/0326169 A1 | 10/2021 | Chidambaram Nachiappan et al. | |
| 2021/0349657 A1 | 11/2021 | Darji | |
| 2021/0349749 A1 | 11/2021 | Guha | |
| 2022/0035565 A1* | 2/2022 | Ki | G06F 3/0604 |
| 2022/0237133 A1 | 7/2022 | Simionescu et al. | |

OTHER PUBLICATIONS

Final Office Action for U.S. Appl. No. 17/082,933 dated May 18, 2022, 33 pages.

Office Action for U.S. Appl. No. 17/082,933 dated Dec. 21, 2021, 32 pages.

Office Action for U.S. Appl. No. 17/082,933 dated Oct. 31, 2022, 38 pages.

Wong et al. "Zygaria: Storage Performance as a Managed Resource," Proceedings of the Twelfth IEEE Real-Time and Embedded Technology and Applications Symposium (RTAS'06), 2006, 10 pages.

* cited by examiner

SYSTEMS AND METHODS FOR I/O COMMAND SCHEDULING BASED ON MULTIPLE RESOURCE PARAMETERS

CROSS-REFERENCE TO RELATED APPLICATION(S)

This application is a continuation of U.S. patent application Ser. No. 17/333,316, filed on May 28, 2021, which claims priority to U.S. Provisional Patent Application No. 63/179,013 filed on Apr. 23, 2021, the contents of both of which are incorporated herein by reference in their entirety.

FIELD

The present disclosure is related to storage devices, and more particularly to systems and methods for I/O command scheduling based on multiple resource parameters.

BACKGROUND

A host computing device may provide commands (e.g., read and write commands) for processing by a storage device. The host computing device may have certain quality of service (QoS) requirements for the processing of the commands. In certain situations, however, there may not be enough hardware resources to process the commands in compliance with the QoS requirements, for example, due to traffic collisions and bandwidth collisions, thus resulting in jitter.

Accordingly, there is a need for a system and method for scheduling commands for processing by a storage device that considers availability of the hardware resources of the storage device for addressing QoS requirements.

SUMMARY

According to an embodiment, a method for scheduling input/output (I/O) commands is described. The method may include: receiving, by an I/O scheduler, an I/O command from an application; generating, by the I/O controller, an I/O resource requirement based on the I/O command; determining, by a traffic controller, that an amount of available resources satisfies a criteria based on the I/O resource requirement; and sending, by the traffic controller, the I/O command to a queue in response to the criteria being satisfied.

The resources associated with storage device may include at least one of a number of available hardware tokens, an amount of available buffer, or an amount of available direct memory access (DMA) descriptor, and wherein information on the amount of available resources is obtained via a device hint and adjusted by an oversubscription factor.

The determination of the criteria being satisfied comprises: determining, by the traffic controller, that an amount of scheduled I/O commands is less than a reserved amount of resources; determining, by the traffic controller, that the amount of scheduled I/O commands is less than a predetermined traffic threshold value; and determining, by the traffic controller, that an amount of required resources based on the I/O resource requirement is less than an amount of available resources.

The method may further include: allocating required resources to the I/O command based on the amount of required resources determined from the I/O resource requirement; and deallocating the resources from the I/O command in response to determining that the I/O command is complete.

The method may further include sending, by the traffic controller, the I/O command to the I/O scheduler and incrementing a traffic collision count of an I/O utilization counter, in response to the amount of scheduled I/O command being greater than the predetermined traffic threshold value.

The method may further include sending, by the traffic controller, the I/O command to the I/O schedule and incrementing a resource collision count of an I/O utilization counter, in response to the amount of required resources based on the I/O resource requirement being less than the amount of available resources.

The method may further include increasing the predetermined traffic threshold value in response to a traffic collision.

The method may further include resetting the traffic threshold value to the predetermined traffic threshold value in response to a pause in receiving an I/O command from the I/O scheduler for a predetermined duration of time.

The I/O resource requirement may include a buffer and a DMA descriptor.

According to another embodiment, a system for scheduling I/O commands for processing by a storage device is described. The system may include: a processor; and
a memory configured to store instructions that, when executed, cause the processor to: receive, by an I/O scheduler, an I/O command from an application;
generate, by the I/O controller, an I/O resource requirement based on the I/O command; determine, by a traffic controller, that an amount of available resources satisfies a criteria based on the I/O resource requirement; and send, by the traffic controller, the I/O command to a queue in response to the criteria being satisfied.

The resources associated with storage device may include at least one of a number of available hardware tokens, an amount of available buffer, or an amount of available direct memory access (DMA) descriptor, and wherein information on the amount of available resources is obtained via a device hint and adjusted by an oversubscription factor.

The determination of the criteria being satisfied for the system may include: determining, by the traffic controller, that an amount of scheduled I/O commands is less than a reserved amount of resources; determining, by the traffic controller, that the amount of scheduled I/O commands is less than a predetermined traffic threshold value; and determining, by the traffic controller, that an amount of required resources based on the I/O resource requirement is less than an amount of available resources.

The instructions may further cause the processor to: allocate required resources to the I/O command based on the amount of required resources determined from the I/O resource requirement; and deallocate the resources from the I/O command in response to determining that the I/O command is complete.

The instructions may further cause the processor to send, by the traffic controller, the I/O command to the I/O scheduler and increment a traffic collision count of an I/O utilization counter, in response to the amount of scheduled I/O command being greater than the predetermined traffic threshold value.

The instructions may further cause the processor to send, by the traffic controller, the I/O command to the I/O schedule and increment a resource collision count of an I/O utilization counter, in response to the amount of required resources based on the I/O resource requirement being less than the amount of available resources.

The instructions may further cause the processor to increase the predetermined traffic threshold value in response to a traffic collision.

The instructions may further cause the processor to reset the traffic threshold value to the predetermined traffic threshold value in response to a pause in receiving an I/O command from the I/O scheduler for a predetermined duration of time.

The I/O resource requirement for the system may include a buffer and a DMA descriptor.

According to another embodiment, a system is described. The system may include: a storage device include storage device resources for processing I/O commands to access a non-volatile memory of the storage device; a host device associated with the storage device and configured to send the I/O commands to the storage device, wherein the host device comprises an I/O controller configured to schedule the I/O commands, wherein the I/O controller may be configured to: generate an I/O resource requirement based on the I/O command received from an I/O scheduler; determine, by a traffic controller of the I/O controller, that an amount of available resources satisfies a criteria based on the I/O resource requirement; and send, by the traffic controller, the I/O command to a queue in response to the criteria being satisfied.

The I/O controller of the system may be further configured to: determine, by the traffic controller, that an amount of scheduled I/O commands is less than a reserved amount of resources; determine, by the traffic controller, that the amount of scheduled I/O commands is less than a predetermined traffic threshold value; determine, by the traffic controller, that an amount of required resources based on the I/O resource requirement is less than an amount of available resources; allocate required resources to the I/O command based on the amount of required resources determined from the I/O resource requirement; process the I/O command by the storage device; determine that the processing of the I/O command is complete; and deallocate the resources from the I/O command in response to the determination of the I/O command being complete.

Figure 1:
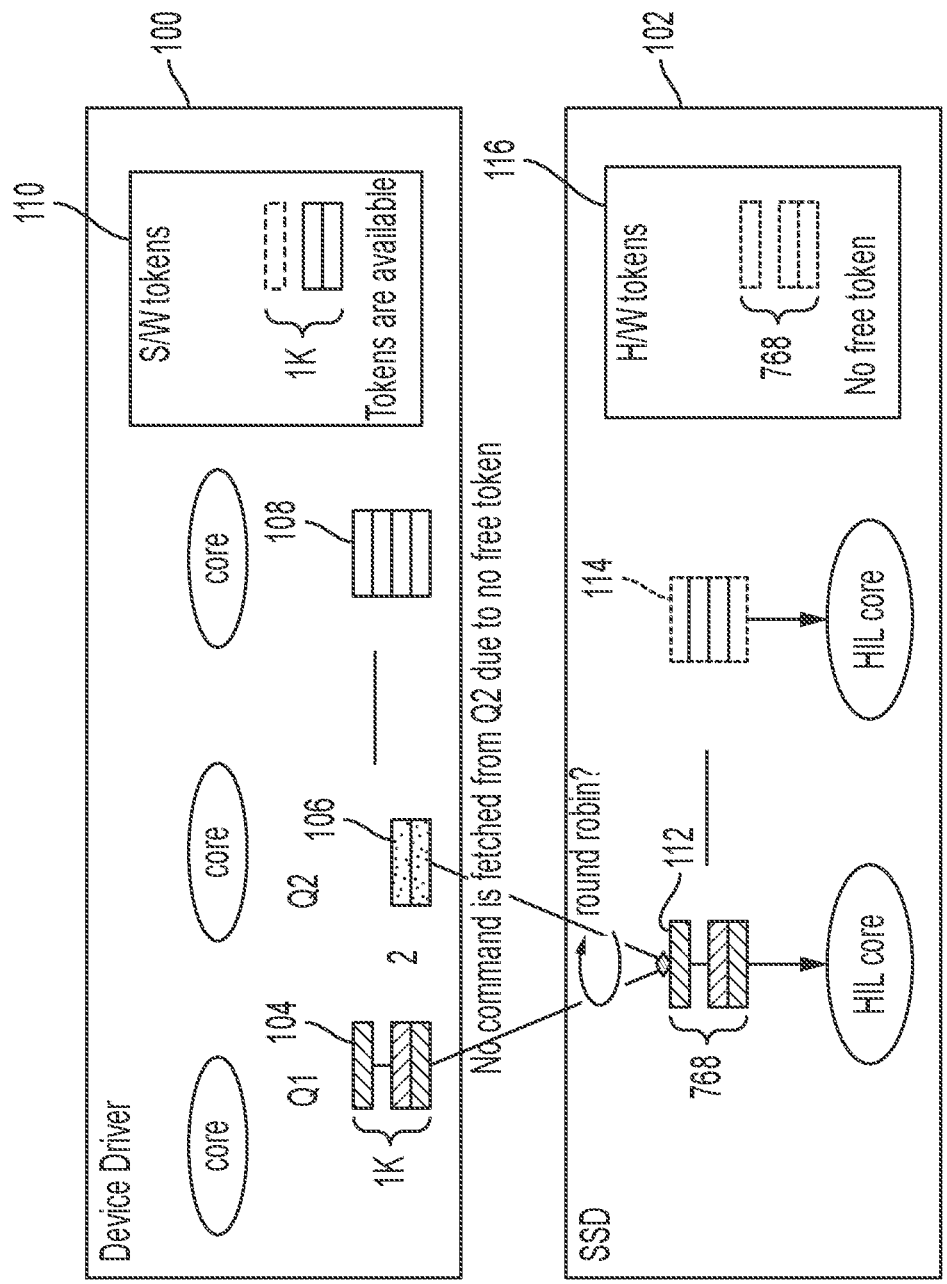
FIG. 1 is a conceptual block diagram of a system for scheduling input/output (I/O) commands, according to some embodiments.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Generally speaking, a storage device may have a limited number of hardware resources for processing input/output (I/O) commands from a host computing device. The hardware resources may be, for example, hardware queues and associated tokens that may be used for scheduling the I/O commands for processing. The size of the hardware queues and associated number of tokens may be implementation specific, and may depend on the storage device's performance and QoS requirements.

A device driver interacting with the storage device may allocate software resources to the I/O commands that are to be processed. The software resources may be, for example, software queues and associated tokens. The depth of the software queues and associated tokens may be arbitrary, and may exceed the depth of the hardware queues and its associated tokens. This may sometimes result in the device driver scheduling more I/O commands than the hardware resources available in the storage device. In such a situation, an I/O command that is scheduled by the device driver, but that cannot consume a hardware resource, may experience delays in processing, resulting in high jitter.

FIG. 1 is a conceptual block diagram of a system for scheduling I/O commands according to some embodiments. The system includes a device driver 100 configured to submit I/O commands for processing by a storage device 102. The device driver 100 may include various software queues 104-108 for storing I/O commands submitted by one or more applications of a host processing device. For example, queue 104 (Q1) may be a deep write queue configured to store write I/O commands, while queue 106 (Q2) may be a shallow read queue configured to store read I/O commands. The I/O commands may consume software resources (e.g. software queues 104-108 and tokens 110), to deliver the I/O commands to the storage device 102 for processing.

Similar to the device driver 100, the storage device 102 may include one or more hardware queues 112-114 configured to store the I/O commands submitted by the device driver 100. For example, hardware queue 112 may be configured to store I/O commands fetched from Q1 104 and Q2 106. The I/O commands in the hardware queue 112 may consume hardware resources (e.g. hardware tokens) 116.

The I/O commands with assigned hardware resources 116 may be scheduled for processing by the storage device.

The various software queues 104-108 configured in the device driver may be for addressing QoS provisions for the processing of the I/O commands. For example, by separating write and read I/O commands into separate queues 104, 106, and by employing a scheduling algorithm such as round robin, the read I/O commands in Q2 may generally be serviced in a predictable time window. In some situations, however, although there are I/O commands in Q2 that have been queued up with the expectation of being processed, resource conflicts within the storage device may prevent the servicing of the I/O commands in Q2 as expected.

To illustrate this point, an example may be considered where Q1 104 has 1000 write I/O commands queued up, and Q2 106 has 10 read I/O commands queued up. It is assumed for purposes of this example that the 1000 write I/O commands consumes 1000 software tokens 110, and may be submitted to the storage device for processing. According to this example, however, the storage device 102 only has 768 hardware tokens 116 to be assigned. Thus, the storage device 102 fetches up to 768 write I/O commands from Q1 104 for processing, causing all 768 hardware tokens 116 to be consumed. Given that the write I/O commands have consumed all the hardware tokens 116, with more write I/O commands with software tokens 110 assigned that are left to be processed, the read I/O commands in Q2 may be unable to be processed during their expected time window. Thus, the QoS requirements for Q2 may not be able to be satisfied.

Embodiments of the present disclosure are directed to a system and method for resource-based scheduling of I/O commands that consider availability of multiple resource parameters of the storage device for submitting the I/O commands for processing. According to one embodiment, hardware resources of a storage device are monitored for matching/synchronizing with the software resources. Once synchronized, the software resources may be assigned to I/O commands as desired. The assigning of the software resources to the I/O commands may be based on, for example, a determined QoS as set forth in a service level agreement (SLA). Although QoS is used as an example of a criteria that may be used to determine allocation of the software resources, a person of skill in the art should recognize that other criteria may also be considered, such as, for example, user preferences, and/or the like.

According to one embodiment, the device driver includes a software token manager configured to identify hardware resource information, and update the software resource information accordingly. In one embodiment, the software token manager updates a number of available software resources to match a number of available hardware resources. A certain portion of the available software resources may be reserved for one or more queues of the device driver based on, for example, QoS expectations. The remaining software resources may be part of a shared pool. In one embodiment, the software token manager assigns software tokens/resources from the shared pool, to I/O commands in the software queues, for submitting the I/O commands to the storage device for processing. According to one embodiment, if there are no software resources in the shared pool to be assigned to an I/O command in a queue, the software token manager may access the software tokens reserved for the queue, and assign one of the reserved tokens to the command. The reserved tokens may allow I/O commands to be processed in a timely manner for satisfying QoS requirements.

Figure 2:
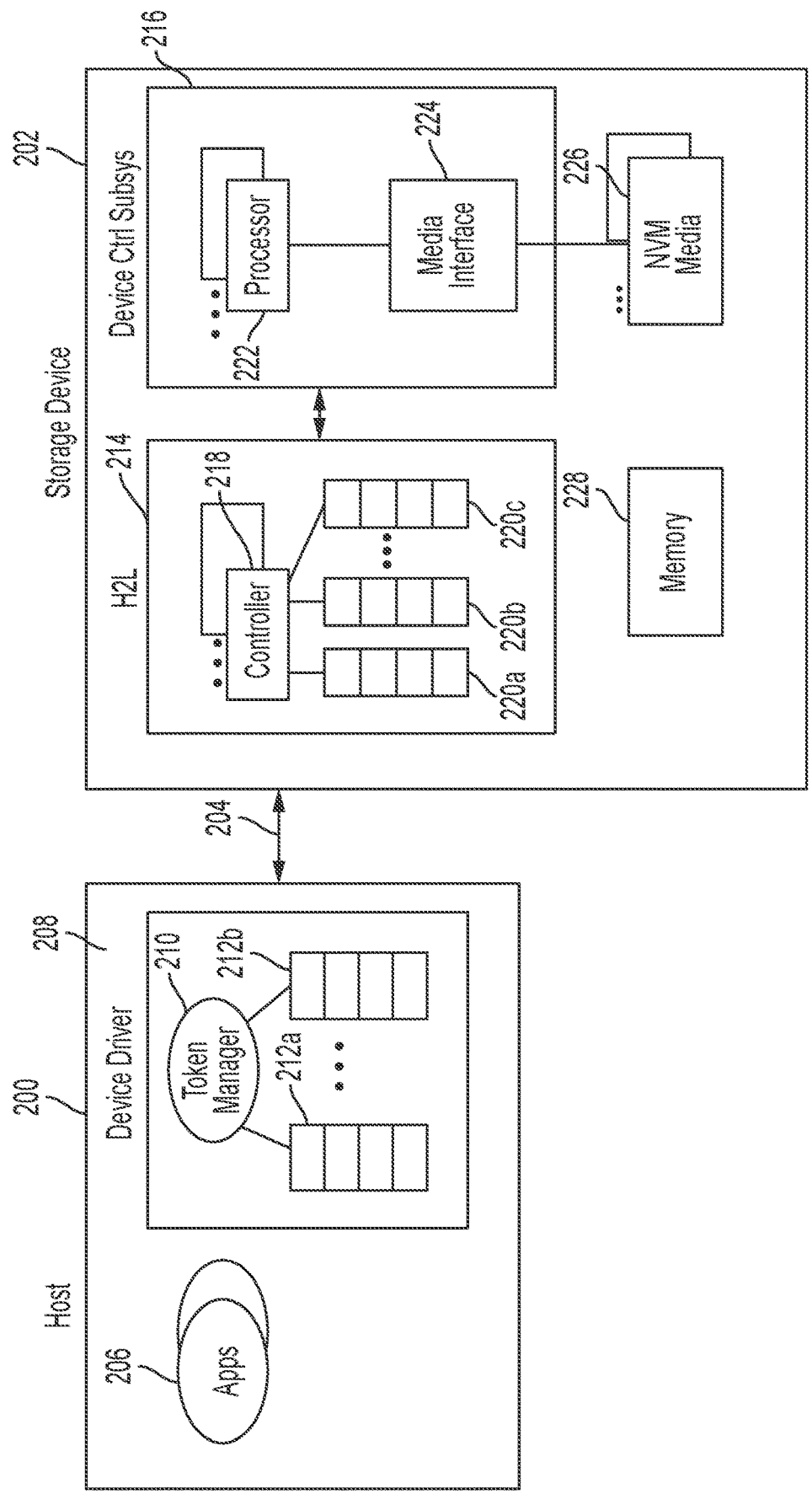
FIG. 2 is a block diagram of a system for resource-based scheduling of I/O command, according to some embodiments.

FIG. 2 is a block diagram of a system for resource-based scheduling of I/O commands according to one embodiment. The system may include a host computing device 200 coupled to a data storage device 202 over a storage interface bus 204. The storage device 202 may be a non-volatile storage device such as, for example, a solid state drive (SSD), an Ethernet SSD (eSSD), Universal Serial Bus (USB) drive, Security Digital (SD) Card, embedded Multi-Media Controller (eMMC), Universal Flash Storage (UFS), and/or the like. The storage interface bus 106 may be, for example, a Peripheral Component Interconnect Express (PCIe) bus, Ethernet, and CXL (Compute Express Link). In one embodiment, the host device 200 transfer and receive data to and from the data storage device 202 over the storage interface bus 206, using a storage interface protocol. The storage interface protocol may be, for example, a non-volatile memory express (NVMe) protocol or any other like protocol that uses queues for storing I/O commands to be processed.

In one embodiment, the host 200 includes one or more applications 206 running in an application layer of the host 200. The one or more applications 206 may be software applications that are stored in host memory space for execution by a processor. In one embodiment, the one or more applications 206 may send I/O commands to the storage device 202 for processing. For example, the one or more applications may issue read I/O commands for reading data from the storage device, write I/O commands for writing data into the storage device, and/or other I/O requests.

In one embodiment, the host 200 includes a device driver 208 configured to interface with the storage device 202. In one embodiment, the device driver is implemented as software instructions that are stored in the host memory, and which are executed by the processor. The device driver 208 may include one or more queues 212a, 212b (hereinafter referred to as software queues 212). The software queues 212 may include, for example, one or more submission queues and completion queues. The submission queues may be configured to store I/O commands/requests submitted by the various applications 206. The completion queues may be configured to store completion messages for the I/O commands/requests processed by the by the storage device 202.

The one or more software queues 212 (e.g. submission queues) may be dedicated to store certain types of I/O commands from the host 200. For example, one queue may be dedicated to store read I/O commands from the applications, while another queue may be dedicated to store write I/O commands. In one embodiment, certain QoS requirements may be imposed on the software queues 212 based on one or more SLAs. For example, a certain number of the I/O commands in the software queues 212 may be expected to be processed in a given time period. Different QoS requirements may be associated with the different software queues 212.

The device driver 208 may further include a token manager 210 configured to manage software resources that may influence the scheduling of I/O commands that are to be processed. The software resources may be, for example, software tokens and/or queues 212. In one embodiment, the token manager 210 is configured to determine availability of software tokens based on information from the storage device, and assign available tokens to I/O commands stored in the software queues 212. The token manager 210 may be configured to maintain availability information on a per controller and/or token type basis. The assigned tokens may be from a shared pool when tokens are available in the shared pool, or from a pool that is reserved for a queue, for I/O commands submitted to the queue.

In one embodiment, the storage device 202 includes a host interface layer (HIL) 214 for interfacing between the host 200 and a device control subsystem 216. The HIL 214 may include, without limitation, one or more controllers 218 and one or more queues 220a-220c (hereinafter referred to as hardware queues 220). The depth of the hardware queues 220 may depend, for example, on a processing power of the storage device. In one embodiment, different queues may be maintained for different types of processing by the storage device. For example, one hardware queue may store I/O commands for processing by a hardware acceleration engine, and another queue may store I/O commands for processing via firmware.

The controllers 218 may be implemented via one or more processors such as, for example, a field programmable gate array (FPGA), embedded FPGA (eFPGA), an application specific integrated circuit (ASIC), co-processor, complex programmable logic device (CPLD), and/or any suitable digital and/or analog circuitry. One of the one or more controllers 218 may be associated with one or more hardware queues 220. The one of the controllers 218 may be configured to manage and assign hardware resources to I/O commands submitted for processing in the software queues 212. The hardware resources may be, for example, hardware tokens and/or queues 220.

In one embodiment, the one or more controllers 218 are configured to fetch I/O requests/commands from one or more of the software queues 212, and store the fetched requests into the one or more of hardware queues 220 corresponding to the one or more controllers 218. In some embodiments, the requests may be fetched and submitted by the device driver 208.

The I/O commands stored in the hardware queues 220 may be assigned hardware tokens for processing. In one embodiment, different types of hardware tokens may be maintained and assigned depending on the type and number of hardware queues 220. For example, a first type of hardware token may be assigned to a first hardware queue 220a dedicated for processing by a hardware acceleration engine, while a second type of hardware token may be assigned to a second hardware queue 220b dedicated for processing via firmware.

The number of available hardware tokens to be assigned to the I/O commands in the different hardware queues 220 may depend on the number of I/O commands already in the queues. In one embodiment, the tokens are assigned by the controller 218 based on hardware queue type. In one embodiment, hardware tokens are automatically assigned upon storing of I/O commands in the one or more hardware queues 220. Commands that have assigned hardware tokens may be scheduled for processing by the device control subsystem 216.

In one embodiment, the device control subsystem 216 interacts with the controllers 218 for executing I/O commands requested by the applications 206. The subsystem 216 may include, without limitation, one or more processors 222 and one or more media interface(s) 224. The one or more processors 222 may be configured to execute computer-readable instructions for processing I/O commands to and from the controllers 218, and for managing operations of the storage device 202. The computer-readable instructions executed by the one or more processors 222 may be, for example, firmware code.

In one example, the one or more processors 222 may be configured to interact with the controllers 218 for receiving write or read I/O commands to or from NVM media 226. The one or more processors 222 may interact with the NVM media 226 over the media interface 224 for effectuating the write or read actions. The NVM media 226 may include one or more types of non-volatile memory such as, for example, flash memory.

In one embodiment, the storage device 202 further includes an internal memory 228 for short-term storage or temporary memory during operation of the storage device 202. The internal memory 228 may include a DRAM (dynamic random access memory), SRAM (static random access memory), and/or DTCM (Data Tightly Coupled Memory). The internal memory 228 may be used to store, for example, the hardware queues 220.

Figure 3:
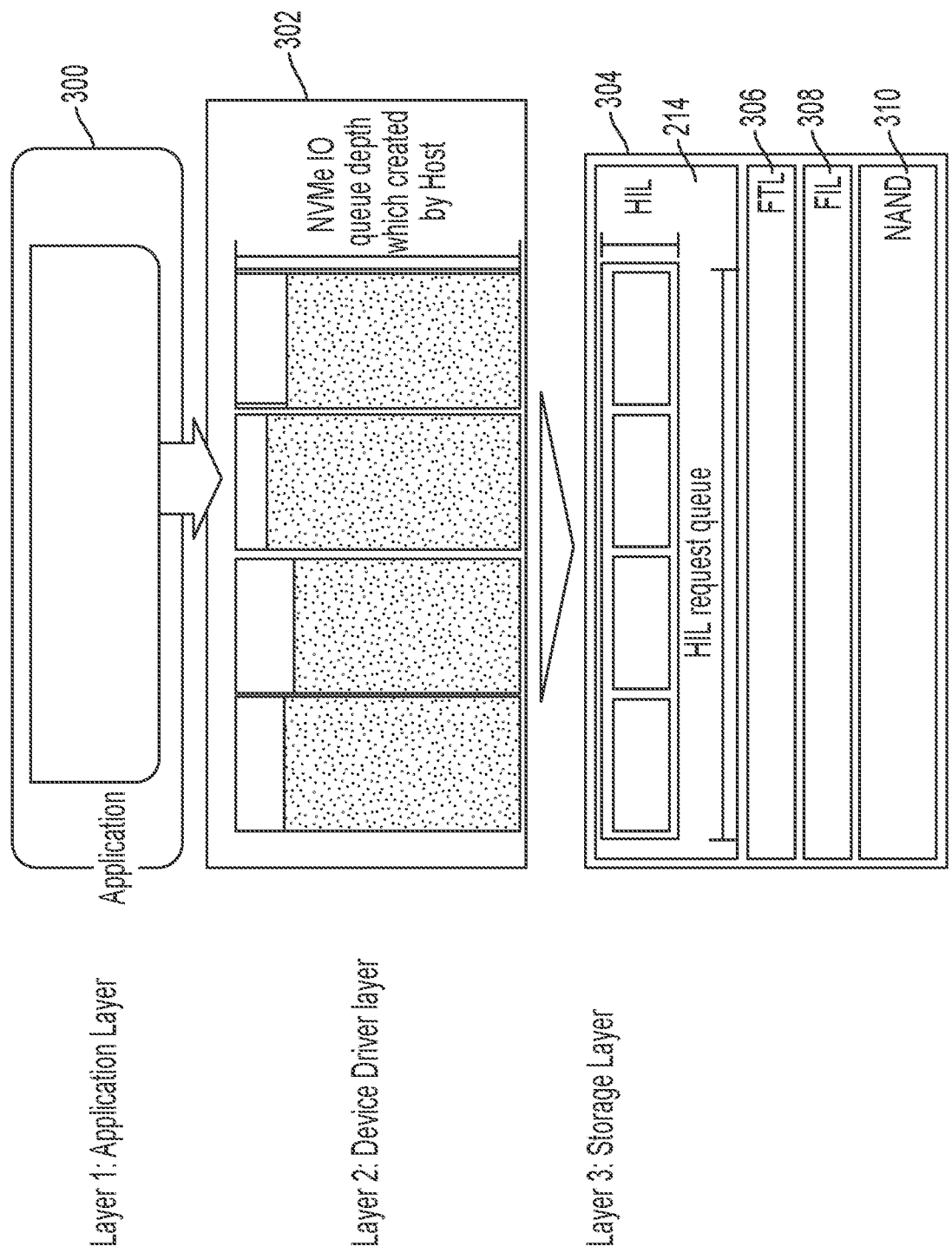
FIG. 3 is a block diagram of various abstraction layers of the system of FIG. 2, according to some embodiments.

FIG. 3 is a block diagram of various abstraction layers of the system of FIG. 2 according to one embodiment. The abstraction layers of the host 200 may include an application layer 300 and a device driver layer 302. The application layer 300 may be configured to generate I/O commands based on I/O requests issued by the applications 206. The I/O commands generated by the application layer 300 may confirm to the storage interface protocol of the storage interface bus 204 used for communicating with the storage device 202.

In one embodiment, the device driver layer 302 includes the software queues 212 and token manager 210. The I/O commands generated by the application layer 300 are stored in the queues 212 in the device driver 208 based on, for example, the I/O command type. The token manager 210 may determine availability of software tokens based on information from the storage device, and assign available tokens to I/O commands stored in the software queues 212. In the event that all tokens are assigned, service may be rejected. In one embodiment, an I/O command may be allowed to be queued in the software queues 212, but if no available tokens exist, the I/O command may not be submitted to the hardware queues 220 for processing.

In one embodiment, the storage device 202 includes a storage layer 304 that may include various sublayers. The various sublayers may include the host interface layer 214 as well as other layers for interfacing with the NVM media 226 such as, for example, a flash translation layer 306 and flash interface layer 308. The NVM media 226 may be included in the storage layer 304 as flash media 310.

Figure 4A:
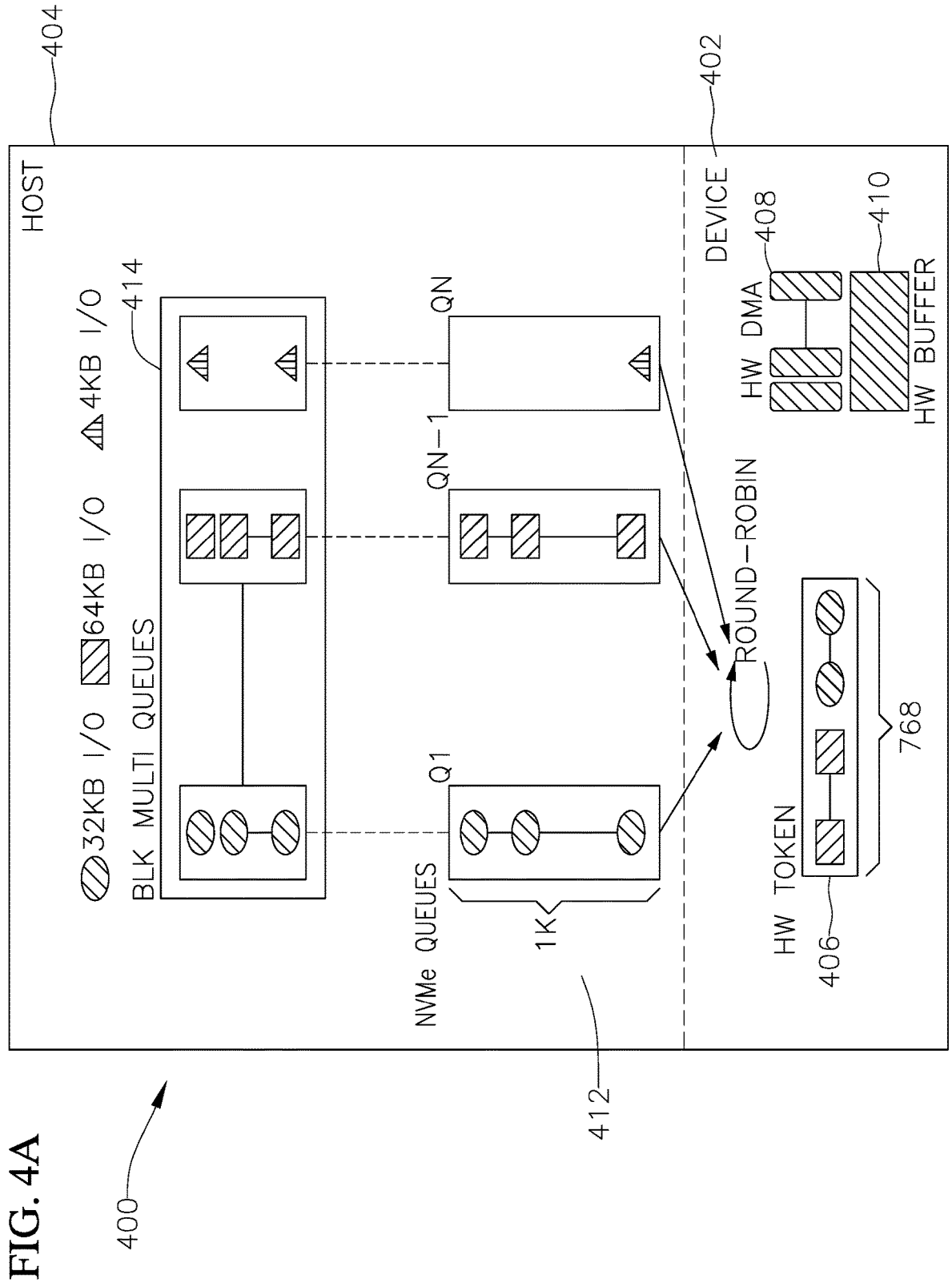
FIGS. 4A-4B are block diagrams of a system for scheduling I/O commands, according to some embodiments.

FIG. 4A is a conceptual block diagram of a system for scheduling I/O commands according to another embodiment. The system 400 includes a storage device 402 such as, for example a solid-state drive (SSD) that uses non-volatile memory express (NVMe) protocol and a host device 404 for controlling the operations of the storage device. The storage device may include hardware tokens 406, hardware direct memory access (DMA) descriptor 408, and hardware buffer 410, and the host device may include queues 412 Q1-Qn (e.g., NVMe queues) and block multiple queues and I/O scheduler 414. Accordingly, a software application may send an I/O command (e.g., a read or write command) to the block multiple queue 414 to be processed by the storage device 402, and the block multiple queue 414 pushes the I/O command to the queue 412. The storage device 402 may then fetch the I/O command from the queue 412 for processing the I/O command. If there are multiple I/O commands in the queue 412, then the storage device 402 may fetch the I/O commands, for example, in a round robin manner from each queue 412. Because I/O commands are usually read or write I/O commands, data is transferred between the host device 404 and the storage device 402 (e.g., to/from a NAND flash memory of the storage device 402). In such case, when the I/O command is fetched by the storage device, a hardware token 406 is assigned to each I/O command, and a determination is made as to the amount of hardware resources needed to process each I/O command. For example, hardware resources may include hardware buffers and DMA descriptors. Accordingly, the I/O command may be processed to transfer the data and once the transfer is complete, the storage device informs the queue 412 that the I/O command is finished. Then, the queue 412 informs the block multiple queue 414 that the processing of the I/O command is finished and the block multiple queue 414 informs the software application that the I/O command is complete.

In more detail, the I/O commands generated from the software application to the block multiple queue 414 may be in different sizes and different I/O rates. In the conceptual example of FIG. 4A, there are different I/O streams and each I/O stream has a different I/O rate. That is, the I/O stream represented by ovals have a 32 KB I/O rate, the rectangles have a 64 KB I/O rate, and the triangles have a 4 KB I/O rate, and each of these I/O streams are assigned to a different queue 412. For example, the 32 KB I/O stream is assigned to Q1, the 64 KB I/O stream is assigned to Qn−1, and the 4 KB I/O stream is assigned to Qn. Each queue 412 Q1 to Qn may be able to queue multiple I/O commands as indicated by each of the ovals, rectangles, or triangles in FIG. 4A. As the queues 412 fill up with I/O commands, the storage device 402 fetches from the queue 412 in a round robin manner, but because the I/O rates for Q1 to Qn−1 are faster than the I/O rate for Qn, most of the I/O commands that are scheduled to be fetched by the storage device are taken by the Q1 to Qn−1 queues. For example, the I/O command for the 32 KB I/O stream occupies all of the available resources (e.g., hardware buffer and DMA descriptor), and therefore the I/O commands for the 64 KB I/O stream has to wait until all of the I/O commands for the 32 KB I/O stream are finished so that the hardware resources may be released. Consequently, the slower queues such as Qn has to wait until all of the faster I/O commands are completed before they can be scheduled to be fetched.

Accordingly, the I/O commands for the slower I/O streams are delayed, resulting in I/O traffic collisions and unfair scheduling of the I/O commands.

Additionally, some scheduling techniques as described above may result in uncontrolled I/O bandwidth. As the data moves between the host device and the storage device, the I/O commands that require larger size data transfers consume the storage device resources such as the hardware buffer and DMA descriptor. Consequently, the queues for the other I/O commands may be delayed and negatively affect I/O responsiveness even for the smaller I/O commands. Thus, techniques to overcome uncontrolled I/O bandwidth and uncontrolled I/O traffic collisions are desired.

Figure 4B:
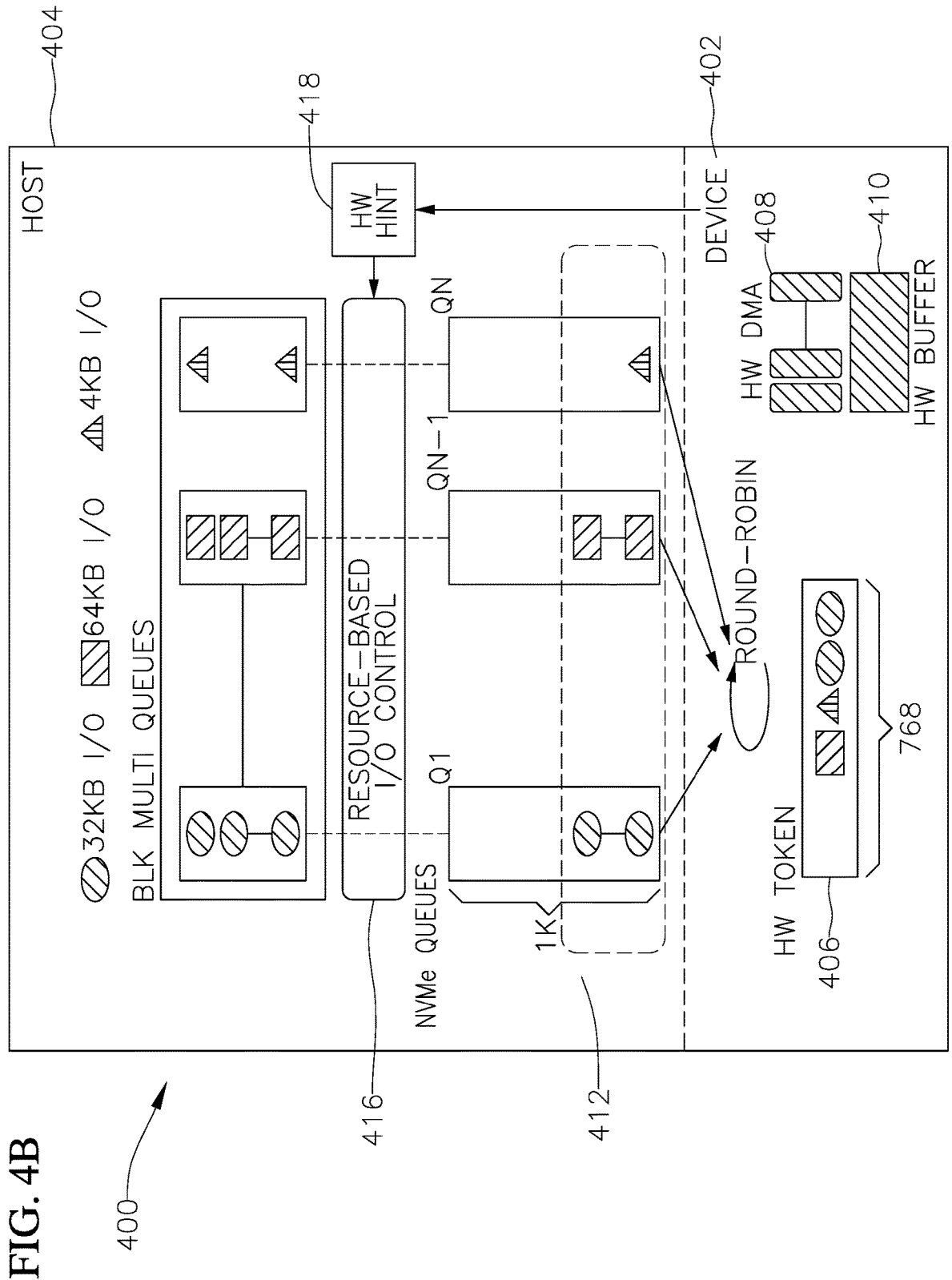

FIG. 4B is another conceptual block diagram of a system for scheduling I/O commands according to some embodiments. In some systems, only a portion of an amount of available resources (e.g., hardware tokens) may be pooled and shared by all of the queues and the remaining amount of the resources are reserved for designated queues so that the reserved resource are not used by the faster rate I/O stream queues 412.

For example, 4 tokens for I/O commands may be reserved in each queue 412 Q1 to Qn. Thus, if there are three queues (i.e., Q1, Qn−1, Qn), then a total of 12 (i.e., 4 tokens×3 queues) tokens are reserved. Accordingly, if there are 768 hardware tokens, then only 12 out of the 768 hardware tokens are reserved and the remaining 756 hardware tokens are available to be shared by all of the queues 412 Q1 to Qn. Accordingly, even if the I/O commands that have the faster I/O stream rates take up all of the shared hardware tokens, the hardware tokens that are reserved by the slower I/O streams will not be taken. While, this technique improves the fairness of scheduling of the I/O commands, the shared portion of the hardware tokens are still uncontrolled and may result in uncontrolled I/O traffic.

Thus, according to another embodiment, the I/O command may be scheduled based on availability of resources such as, for example, hardware token, DMA descriptor, and buffer. In some embodiments, the availability of other resources may be considered depending on the type of storage system. Accordingly, the I/O command may be converted from an I/O request to an amount of required resources for the I/O command before making a scheduling decision (e.g., whether to schedule the I/O command or reschedule for a later time). In some embodiments, the scheduler may check the available resources with the amount of required resources to determine whether there are sufficient resources to process the I/O command, and then decide to either schedule the I/O command or not (e.g., reschedule for later).

For example, queues 412 Q1 to Qn−1 in FIG. 4A are filled with I/O requests, which are beyond the I/O processing capability of the storage device 402. Accordingly, it may cause delays in scheduling the I/O commands for the slower rate I/O streams, such as Qn. Thus, according to some embodiments of the present disclosure as illustrated in FIG. 4B, a resource-based I/O controller 416 may determine the amount resources available from a device hint 418 (e.g., HW-HINT), and then scheduling the I/O command based on the available resources. In some embodiments, the availability and utilization of such resources may be tracked by decreasing the available amount of resources when then I/O command is scheduled, and increasing the amount of available resources when the processing of the I/O command is finished. Accordingly, because queues 412 Q1 to Qn−1 in FIG. 4B are filled based on available resources, the I/O controller is able prevent or reduce over-scheduling of the faster rate I/O streams on queues 412 Q1 to Qn−1. Accordingly, queuing delays by the I/O commands from the slower rate I/O streams may be reduced or avoided.

Figure 5:
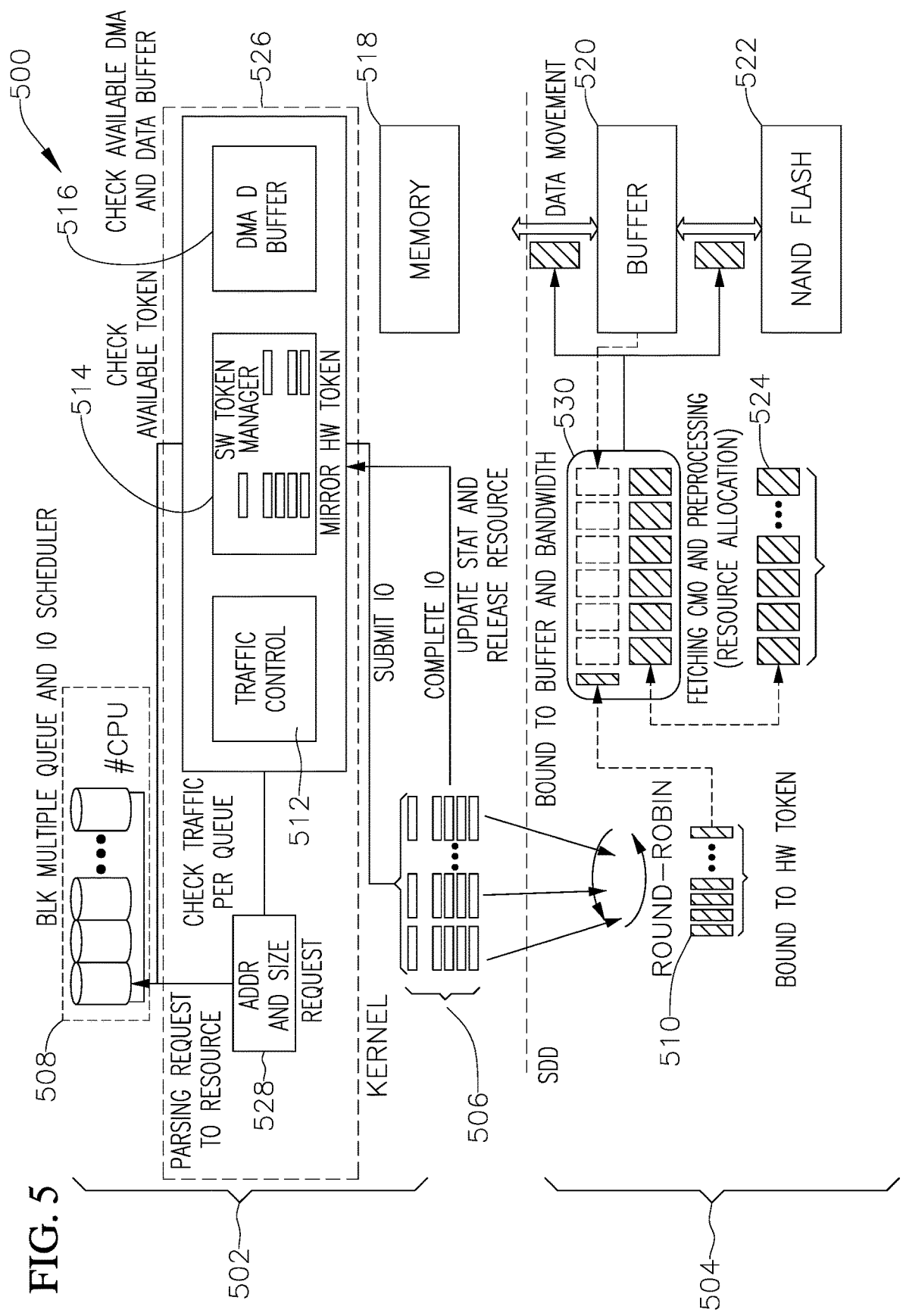
FIG. 5 is a block diagram of a system for scheduling I/O commands, according to some embodiments.

FIG. 5 is a block diagram of a system for resource-based scheduling of IO commands according to an embodiment of the present disclosure. The system 500 may include a storage device 504 such as, for example an SSD that uses non-volatile memory express (NVMe) protocol, serial advance technology attachment (SATA), serial attached small computer system interface (SAS), and/or any other suitable protocol and a host device 502 that includes a kernel for controlling the operations of the storage device. In some embodiments, the host device 502 is coupled to the storage device 504 by a storage interface that uses, for example NVMe or other suitable protocol. The storage device may include hardware tokens 510, hardware DMA 524, hardware buffer 520, and a NAND flash 522 for storing data. The host device 502 may include queues 506 (e.g., NVMe queues) and block multiple queues 508. In some embodiments, the queues 506 may be configured to support at most 1024 queue entries (e.g., maximum queue entries supported (MQES)). In other embodiments, the queues 506 may have a smaller or larger capacity, for example, less than or greater than 1024 MQES. Yet in some embodiments, the queues 506 may be configured by a Linux driver based on a smallest value (e.g., minimum value) of maximum submission/completion queue count ("NSQ") or a number of central processing unit (CPU) count of the host device 504 ("#CPU"). Thus, as previously described with reference to FIGS. 4A-4B, the I/O commands that are in the queues 506 may be fetched by the storage device 504, for examples, in a round robin manner for processing by the storage device 504. Once the I/O commands are fetched, each I/O command is assigned a hardware token 510 (i.e., bound to a hardware token) and then sent to a resource allocator 530 where a DMA descriptor and a buffer are is assigned to the I/O command, and the I/O command is processed (e.g., DMA operation happens between host memory and NAND flash). See, for example, in FIG. 5 where the I/O command is fetched from the queue 506 of the host device 502 and a hardware token 510 is assigned. Then the I/O command with the token already assigned, is sent to a resource allocator 530. In some embodiments, the available DMA descriptor 224 resources are provided to the resource allocator 530 shown by the shaded boxes and the available buffer 520 are provided to the resource allocator 530 shown by the blank boxes. The resource allocator 530 may then assign the DMA descriptors and the buffer to the I/O commands.

Figure 6:
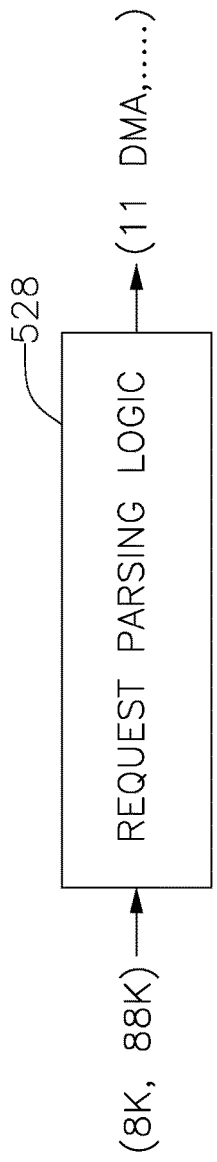
FIG. 6 is a block diagram of an example converter for converting an I/O command, according to some embodiments.

Turning back to the host device 502, in some embodiments, the host device 502 also includes an I/O controller 526 for controlling I/O commands from the block multiple queue 508, according to various embodiments of the present disclosure. In some embodiments, the I/O controller 526 includes a converter 528 for converting I/O commands that are received as an I/O request format from the block multiple queue 508 to an I/O resource requirement format, and a traffic controller 512 for determining whether to send the I/O command to queues 506 or back to the block multiple queue 508. For example, FIG. 6 illustrates a block diagram of the example converter 528, where the I/O command is received in the I/O request format, which, in this example is [8K, 88K], which corresponds to a starting address of 8K, and a data size of 88K for this command. In other words, for example, if the command was for a write operation, then the size of the data that will be written to the storage device is 88K and that data will be stored at a location on the storage device at address 8K. The converter 528 converts this information into a resource requirement format, that includes, for example, 11 DMA descriptors, or some other buffer size. Accordingly, the I/O command in the form of an I/O resource requirement is generated from the I/O request based on the I/O command.

In some embodiments, the I/O controller 526 further includes a traffic controller 512 configured to analyze the I/O command received in the I/O resource requirement format, a software token manager 514 configured to determine an availability of the hardware token 510, and a DMA descriptor (e.g., "DMA D") and buffer checker 516 configured to determine an availability of the DMA descriptor 524 and buffer 520. In some embodiments, the availability of the resources is determined by a device hint (e.g., "HW-HINT") of the host device 502. In other words, the device hint determines and monitors the status and/or availability of the resources in the storage device and provides this information to the host device (e.g., the I/O controller 526). More in particular, the status and/or availability of the hardware tokens 510 is mirrored by the software token manager 514 so that the I/O controller 526 can make decisions based on resource availability. In addition, the device hint also provides the availability of DMA descriptor 524 and buffer 520 at the storage device 504 to the DMA descriptor and buffer checker 516 so that the I/O controller 526 can use this information to determine whether sufficient resources (e.g., DMA descriptor and/or buffer) are available to process the I/O command. While herein the present disclosure, resources refers to hardware token 510, DMA descriptor 524, and buffer 520 by way of example, resources may also refer to other parameters depending on the type of storage device 504 or system 500.

In some embodiments, an oversubscription factor may be utilized to adjust the amount of resources that the device hint has determined to be available. In other words, because the volume of resources indirectly represents a processing power or processing ability of a storage device, scheduling I/O commands based on actual resources may introduce less I/O command submission than the actual capability of the storage device. For example, a 128 KB read operation may be split into multiple data segments inside the storage device, and each of the data segments may be assigned a DMA descriptor and a buffer, and may be processed with DMA operation. In some embodiments, even if most of DMA operations are finished, and the DMA descriptors and the buffer are returned to the storage device, the host device cannot detect that the DMA descriptor and the buffer are available until the I/O command is complete and this indication is provided to the I/O controller 526.

Therefore, the oversubscription factor accounts for this difference by adjusting the available resources. More particularly, the resource-based I/O controller 526 adjusts the amount of resources count of the HW-HINT by considering the differences between resource release time of the host device and the storage device.

Accordingly, the I/O controller 526 may take the I/O command and determine whether certain criteria are satisfied to process this I/O command, and if so, then send the I/O command to the queue 506. For example, the I/O controller 526 may determine that a criteria is satisfied if the storage device 504 has sufficient resources (e.g., DMA descriptors and buffer) as dictated by the I/O resource requirement. In other words, for example, if the resource requirement indicates that a particular I/O command requires 11 DMA descriptors and 88K of buffer, and 20 DMA descriptors and 100K of buffer are available, then the criteria may be satisfied. On the other hand, if there were only 10 DMA descriptors or 50K of buffer, then the resource criteria may not be satisfied. Accordingly, if the criteria are not satisfied, then the I/O command is sent back to the block multiple queue 508 and rescheduled for resubmission to the I/O controller 526 at a later time. At that point, the I/O controller 526 will determine again, whether the criteria are satisfied to process this I/O command the then either send the I/O command to the queue 506 or back to the block multiple queue 508.

Figure 7:
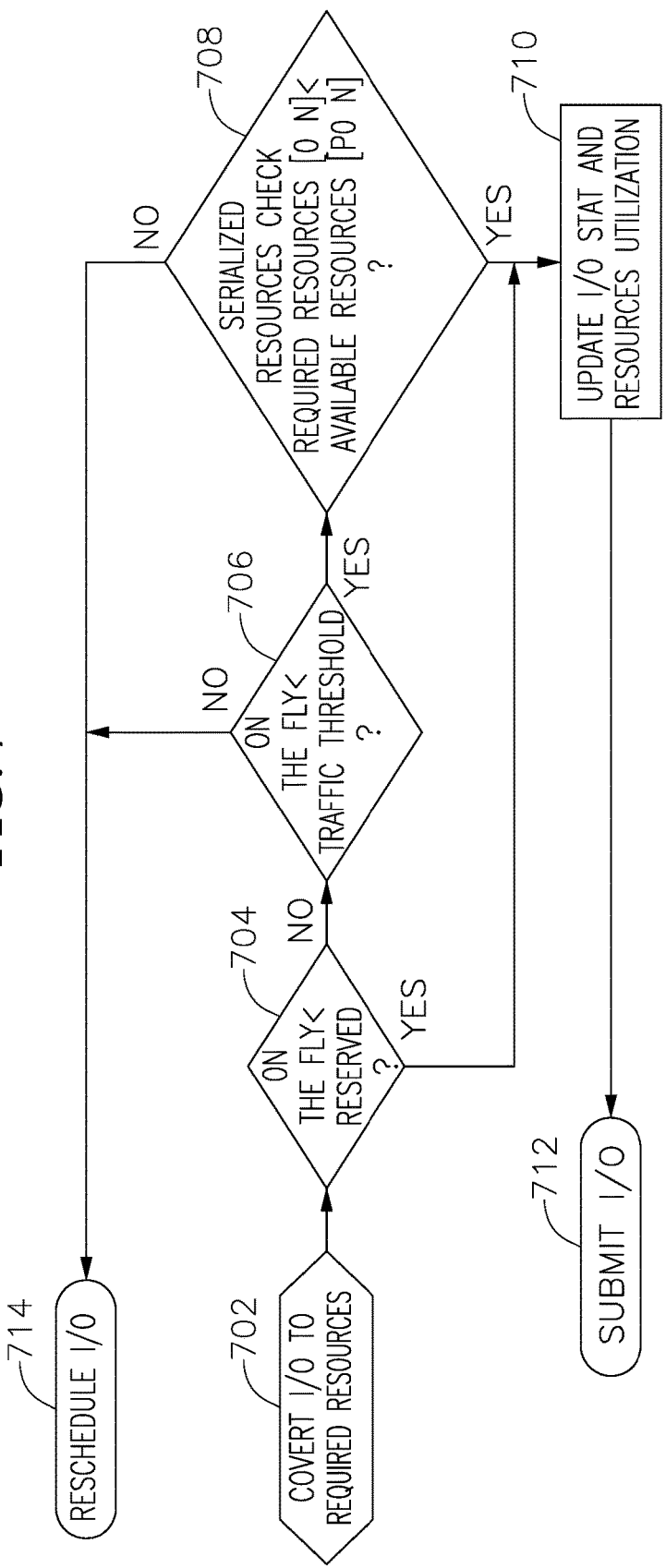
FIG. 7 is a flow chart illustrating a traffic flow process, according to some embodiments.

FIG. 7 is a flow chart illustrating the steps taken by the traffic controller 512 to determine whether to send the I/O command to the queue 506 or to send the I/O command back to the block multiple queue 508 to be rescheduled. In some embodiments, the I/O command is sent from the block multiple queue 508 to the I/O controller 526, and the traffic controller 512 determines whether the I/O command satisfies certain criteria to send the I/O command to the queue 506. More particularly, when the I/O command is received by the traffic controller 512, the I/O command is converted from the I/O request format to the I/O resource requirement format by the converter 528 (702). Thus, the I/O command is now in the format that facilitates determining resource requirements for processing the I/O command, such as, for example, the size and address of the command. In some embodiments, such converted format may be in the form of an I/O descriptor ("IOD") structure.

In some embodiments, the host device includes a memory 518. Memory 518 may be, for example, an internal memory used for short-term storage or temporary memory during operation of the system 500. The memory 518 may include a DRAM (dynamic random access memory), SRAM (static random access memory), and/or DTCM (Data Tightly Coupled Memory). The memory 518 may be used to store, for example, a data structure that includes an I/O statistic and resource utilization counter managed by a device driver to determine the availability of resources for each queue 506. For example, the information may include, a reserved value for tokens, threshold value for tokens, traffic collision count, resource collision count, and on-the-fly count. In some embodiments, the reserved value for tokens correspond to a number of tokens that are reserved for specific queues, as discussed above, for example, where 4 tokens were reserved for each of the queues Q1 to Qn. The threshold value corresponds to the dynamic traffic threshold window value, which will be described in more detail later. The traffic collision count corresponds to the number of times an I/O command collided or had to wait due to all of the token being used. The resource collision count corresponds to the number of times a restricted resource not assignable. Herein the present disclosure, "on-the-fly" refers to the number of I/O requests or I/O request counts that are already scheduled in the queue and/or are being processed. Thus, the I/O command, which is now in the form of I/O resource requirements, is evaluated to determine whether the amount of reserved resources (e.g., reserved hardware token value) is greater than an amount of resources that are on-the-fly (e.g., on-the-fly count) (704). If the amount of reserved resources is greater than the amount of resources that are on-the-fly, then an I/O statistics and resource utilization counter is updated (710) and the I/O command is sent to the queue 506 to be scheduled (712). If the amount of reserved resources is not greater than the amount of resources that are on-the-fly, then a determination is made whether a traffic threshold is greater than an amount of resources that are on-the-fly and whether there are sufficient resources (706). If the traffic threshold is not greater than the amount of resources that are on-the-fly, then the I/O command is sent back to the block multiple queue 508 where it is rescheduled for a later time, and the traffic collision count is incremented. On the other hand, if the traffic threshold is greater than the amount of resources that are on-the-fly and there are sufficient resources, then a serialized hardware resources check is performed (708).

In some embodiments, the serialized hardware resources check includes determining whether an amount of required resources to process this I/O command is less than an amount of currently available resources. In other words, a decision is made to determine whether there are sufficient resources to process this I/O command. If there aren't enough available resources, then the I/O command is sent back to the block multiple queue 508 where it is rescheduled for a later time and the resource collision count is incremented. If the required amount of resources is less than the amount of currently available resources, then there are enough resources to process this I/O command and therefore the I/O stat and resource utilization counter is updated (710) and the I/O command is sent to the queue 506 to be scheduled (712).

Figure 8:
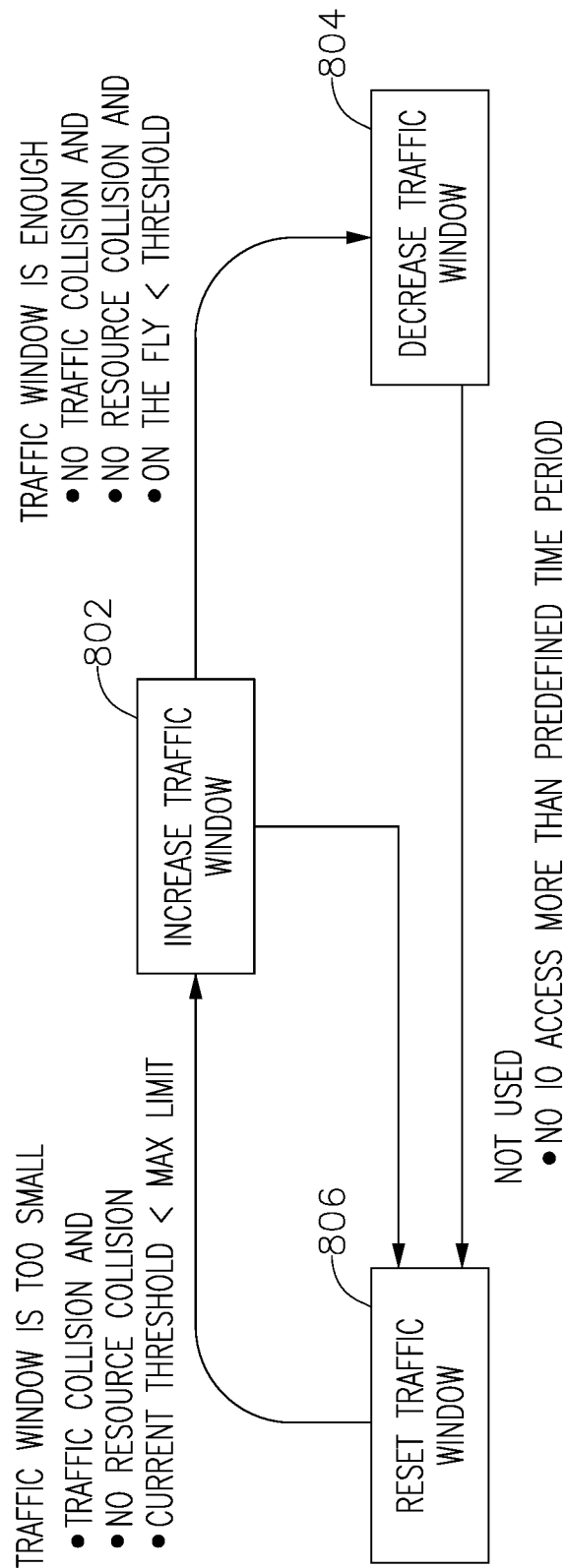
FIG. 8 is a flow chart illustrating a process for adjusting a traffic threshold value, according to some embodiments.

In some embodiments, the traffic threshold is a dynamic threshold that is adjustable based on current traffic status information pertaining to traffic collision, resource collision, and current on-the-fly request count. FIG. 8 is a flow chart that illustrates a process for adjusting the traffic threshold value. For example, the traffic threshold window may be determined to be too small if there is a traffic collision but there is no resource collision, and the current threshold is less than some predetermined threshold limit. In this case, the traffic threshold window may be increased (802). On the other hand, the traffic threshold window may be determined to be big enough if there is no traffic collision and there is no resource collision, and the amount of on-the-fly resources is less than the traffic threshold. In this case, the traffic threshold window may be decreased (804). If there are no I/O commands for some predetermined duration of time, for example, if there is a pause or a momentary stop in receiving I/O commands from the I/O scheduler 508, for 10 seconds, 12 second, etc., then the traffic threshold window may be reset to a default value, for example, 4 or 8 (806). It should be noted that the example duration and default values are provided merely by way of example and is not intended to be limiting. Accordingly, the traffic threshold value may be dynamically adjusted in real-time.

Figure 9:
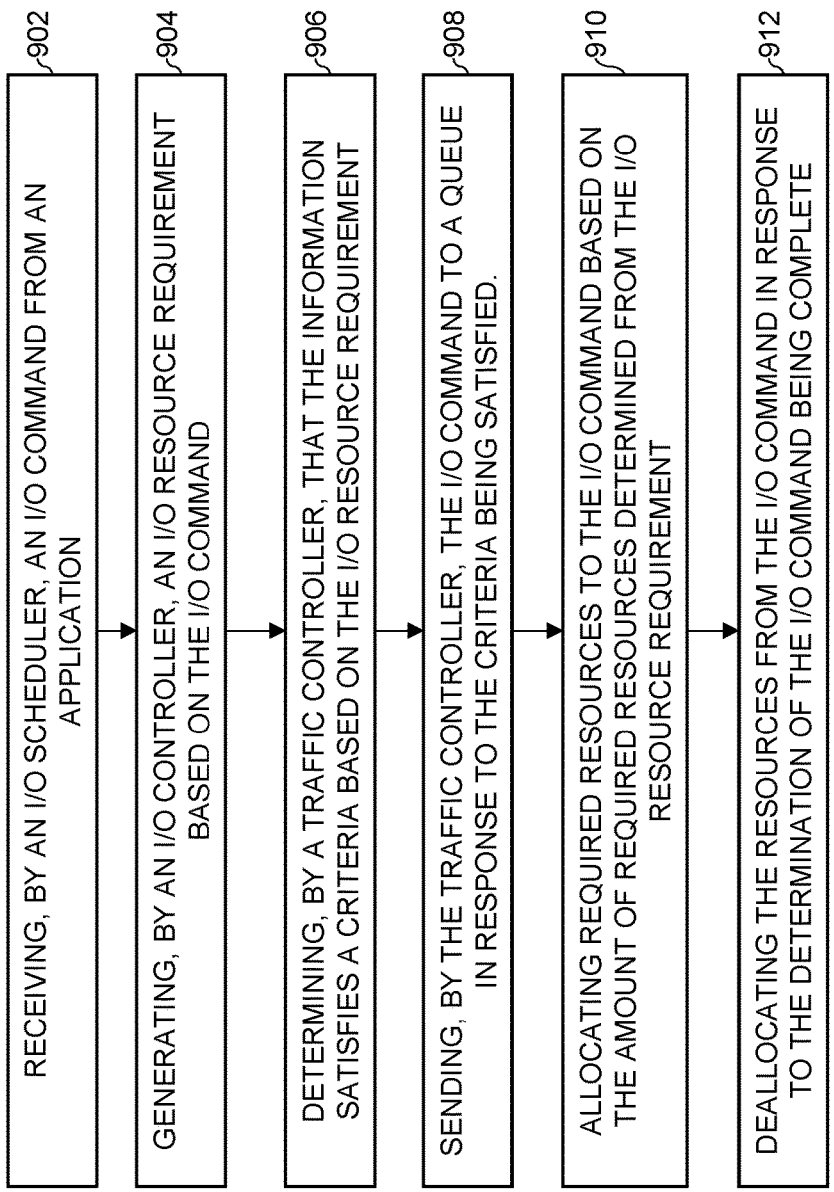
FIG. 9 is a flow chart illustrating a process for scheduling of I/O commands based on multiple resource parameters, according to some embodiments.

FIG. 9 is a flow chart illustrating a process for scheduling of I/O commands based on multiple resource parameters, according to some embodiments. In some embodiments, a system includes a storage device and a host device, and the host device may be configured to obtain information pertaining to an amount of resources associated with the storage device during an initialization by the device driver. In some embodiments, this happens one time during the initialization. The host device includes an I/O scheduler configured to receive an I/O command from an application (e.g., software application) that includes an I/O request (902). The host device further includes an I/O controller and an I/O resource requirement may be generated based on the I/O command so that the resource requirements for the I/O command may be determined (904).

In some embodiments, the I/O controller includes a traffic controller. Accordingly, the traffic controller may determine, that the information received regarding the resources associated with the storage device satisfies a criteria based on the I/O resource requirement of the I/O command (906). In response to the criteria being satisfied, the traffic controller may send the I/O command to a queue, so that the I/O command may be scheduled for processing (908). Next, the required resources are allocated to the I/O command based on the amount of required resources that were determined from the I/O resource requirement (9910). Once the resources are allocated, the I/O command may be processed or executed by the storage device (e.g., DMA operation occurring between host memory and NAND flash), and a determination is made that the processing of the I/O command is complete. Once the processing of the I/O command is complete, the previously allocated resources may be released by deallocating the resources from the I/O command (912). Accordingly, I/O commands may be scheduled on storage devices based on multiple parameter resources according to various embodiments of the present disclosure. Accordingly, delays resulting from uncontrolled I/O traffic and uncontrolled I/O bandwidth collisions may be reduced or avoided. However, the described methods and operations are provided in by way of example only so that a person having ordinary skill in the art would understand, and may involve various additional steps that are not explicitly provided herein. In some embodiments, the temporal order of the operations may be varied.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

The electronic or electric devices and/or any other relevant devices or components according to embodiments of the present invention described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

It will be understood that any of the components or any combination of the components described throughout the present disclosure may be used to performed one or more of the operations described in the flow charts. Moreover, the described operations are merely example operations and may involve various additional steps that are not explicitly described herein. Additionally, the temporal order of the operations may be varies.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A method for scheduling commands, the method comprising:
   receiving a command for accessing a storage device;
   identifying a requirement of a hardware resource for processing the command;
   receiving from the storage device information on availability of the hardware resource;
   determining, based on the requirement of the hardware resource and the information received from the storage device, that an amount of the hardware resource that is available satisfies a criterion; and
   sending the command to a queue based on the criterion being satisfied.

2. The method of claim 1, wherein the amount of the hardware that is available is associated with the storage device and comprise at least one of a number of available tokens, an amount of available buffer, or an amount of available memory access descriptor.

3. The method of claim 1, further comprising:
   allocating the hardware resource to the command; and
   modifying allocation of the hardware resource to the command based on determining that a second criterion is satisfied.

4. The method of claim 1, wherein the determining that the criterion is satisfied comprises at least one of:
   determining that an amount of scheduled commands is less than a reserved amount of hardware resources;
   determining that the amount of scheduled commands is less than a threshold value; or
   determining that the requirement of the hardware resource is less than an amount of the hardware resource that is available.

5. The method of claim 4, further comprising sending, the command to a scheduler and modifying a count of a counter based on the amount of scheduled command being greater than the threshold value.

6. The method of claim 4, further comprising sending the command to a scheduler and modifying a count of a counter based on the requirement of the hardware resource being less than the amount of the hardware resource that is available.

7. The method of claim 4, further comprising increasing the threshold value based on a traffic collision.

8. The method of claim 7, further comprising resetting the threshold value based on detecting a second criterion related to a second command.

9. The method of claim 1, wherein the hardware resource comprises a buffer and a memory access descriptor.

10. A system for scheduling commands for processing, the system comprising:
 a processor; and
 a memory configured to store instructions that, when executed, cause the processor to:
  receive a command for accessing a storage device;
  identify a requirement of a hardware resource for processing the command;
  receive from the storage device information on availability of the hardware resource;
  determine, based on the requirement of the hardware resource and the information received from the storage device, that an amount of the hardware resource that is available satisfies a criterion; and
  send the command to a queue based on the criterion being satisfied.

11. The system of claim 10, wherein the amount of the hardware that is available is associated with the storage device and comprise at least one of a number of available tokens, an amount of available buffer, or an amount of available memory access descriptor.

12. The system of claim 10, wherein the instructions further cause the processor to:
 allocate the hardware resource to the command; and
 modify allocation of the hardware resource to the command based on the processor being configured to determine that the command is complete.

13. The system of claim 10, wherein the determination of the criterion being satisfied comprises at least one of:
 determining that an amount of scheduled commands is less than a reserved amount of hardware resources;
 determining that the amount of scheduled commands is less than a threshold value; or
 determining that the requirement of the hardware resource is less than an amount of the hardware resource that is available hardware.

14. The system of claim 13, wherein the instructions further cause the processor to send the command to a scheduler and modify a count of a counter based on the requirement of the hardware resource being greater than the threshold value.

15. The system of claim 13, wherein the instructions further cause the processor to send the command to a scheduler and modify a count of a counter based on the requirement of the hardware resource being less than the amount of the hardware resource that is available.

16. The system of claim 13, wherein the instructions further cause the processor to increase the threshold value based on a traffic collision.

17. The system of claim 16, wherein the instructions further cause the processor to reset the threshold value based on detecting a second criterion related to a second command.

18. The system of claim 10, wherein the hardware resource comprises a buffer and a memory access descriptor.

19. A system comprising:
 a storage device;
 a computing device associated with the storage device and configured to send a command to the storage device, wherein the computing device includes a processor configured to:
  identify a requirement of a hardware resource for processing the command;
  receive from the storage device information on availability of the hardware resource;
  determine, based on the requirement of the hardware resource and the information received from the storage device, that an amount of the hardware resource that is available satisfies a criterion; and
  send the command to a queue based on the criterion being satisfied.

20. The system of claim 19, wherein the processor is further configured to:
 determine that an amount of scheduled commands is less than a reserved amount of hardware resources;
 determine that the amount of scheduled commands is less than a threshold value;
 determine that the requirement of the hardware resource is less than an amount of available hardware resources;
 allocate the hardware resource to the command;
 determine that the processing of the command is complete; and
 modify allocation of the hardware resource to the command based on the processor being configured to determine that a second criterion is satisfied.

* * * * *